(12) United States Patent
Hooker et al.

(10) Patent No.: US 8,364,902 B2
(45) Date of Patent: Jan. 29, 2013

(54) MICROPROCESSOR WITH REPEAT PREFETCH INDIRECT INSTRUCTION

(75) Inventors: Rodney E. Hooker, Austin, TX (US); John Michael Greer, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 534 days.

(21) Appl. No.: 12/579,931

(22) Filed: Oct. 15, 2009

(65) Prior Publication Data

US 2011/0035551 A1  Feb. 10, 2011

Related U.S. Application Data

(60) Provisional application No. 61/232,084, filed on Aug. 7, 2009.

(51) Int. Cl.
*G06F 12/08* (2006.01)
*G06F 9/30* (2006.01)

(52) U.S. Cl. ............. 711/137; 711/125; 711/E12.057; 712/207; 712/208

(58) Field of Classification Search .................. None
See application file for complete search history.

(56) References Cited

U.S. PATENT DOCUMENTS

| | | | | |
|---|---|---|---|---|
| 5,958,040 A * | 9/1999 | Jouppi | ................... | 712/207 |
| 6,026,478 A * | 2/2000 | Dowling | .................. | 712/24 |
| 6,119,203 A * | 9/2000 | Snyder et al. | .............. | 711/137 |
| 6,832,296 B2 * | 12/2004 | Hooker | .................... | 711/137 |
| 7,177,985 B1 | 2/2007 | Diefendorff | | |
| 7,194,582 B1 | 3/2007 | Diefendorff et al. | | |
| 7,234,025 B2 * | 6/2007 | Hooker | ..................... | 711/137 |
| 7,480,769 B2 | 1/2009 | Diefendorff et al. | | |
| 7,533,242 B1 * | 5/2009 | Moll et al. | ................. | 711/213 |
| 2003/0191900 A1 * | 10/2003 | Hooker | ..................... | 711/137 |
| 2005/0080997 A1 * | 4/2005 | Hooker | ..................... | 711/137 |
| 2006/0136696 A1 * | 6/2006 | Grayson | .................... | 711/206 |
| 2006/0179262 A1 * | 8/2006 | Brittain et al. | ............... | 711/169 |
| 2007/0043907 A1 | 2/2007 | Diefendorff | | |
| 2007/0043908 A1 | 2/2007 | Diefendorff | | |
| 2007/0043909 A1 | 2/2007 | Diefendorff | | |
| 2007/0101104 A1 | 5/2007 | Diefendorff | | |
| 2007/0101105 A1 | 5/2007 | Diefendorff | | |
| 2009/0150622 A1 * | 6/2009 | Allen et al. | ................... | 711/154 |
| 2009/0198948 A1 | 8/2009 | Arimilli et al. | | |
| 2010/0122037 A1 * | 5/2010 | Porat et al. | ................... | 711/137 |

* cited by examiner

*Primary Examiner* — Michael Krofcheck
(74) *Attorney, Agent, or Firm* — E. Alan Davis; James W. Huffman

(57) ABSTRACT

A microprocessor includes an instruction decoder for decoding a repeat prefetch indirect instruction that includes address operands used to calculate an address of a first entry in a prefetch table having a plurality of entries, each including a prefetch address. The repeat prefetch indirect instruction also includes a count specifying a number of cache lines to be prefetched. The memory address of each of the cache lines is specified by the prefetch address in one of the entries in the prefetch table. A count register, initially loaded with the count specified in the prefetch instruction, stores a remaining count of the cache lines to be prefetched. Control logic fetches the prefetch addresses of the cache lines from the table into the microprocessor and prefetches the cache lines from the system memory into a cache memory of the microprocessor using the count register and the prefetch addresses fetched from the table.

50 Claims, 6 Drawing Sheets

Pentium III PREFETCH Instruction

Pentium III REP String Instruction

Repeat Prefetch Instruction

Repeat Prefetch Indirect Instruction

Repeat Prefetch Indirect Instruction (Alternate Embodiment)

MICROPROCESSOR WITH REPEAT PREFETCH INDIRECT INSTRUCTION

CROSS REFERENCE TO RELATED APPLICATION(S)

This application claims priority based on U.S. Provisional Application Ser. No. 61/232,084, filed Aug. 7, 2009, entitled REP PREFETCH INDIRECT, which is hereby incorporated by reference in its entirety.

FIELD OF THE INVENTION

The present invention relates in general to the field of microprocessors, and particularly to prefetching therein.

BACKGROUND OF THE INVENTION

U.S. Pat. No. 6,832,296 describes a prefetch instruction for the x86 architecture that employs the REP prefix to prefetch multiple sequential cache lines from memory into the processor's cache memory, namely a number of sequential cache lines specified by a count in a general purpose register of the processor. However, there are situations in which the programmer knows that he wants to prefetch a set of cache lines that are non-sequential in memory, indeed seemingly arbitrary in their locations. A program wanting to accomplish the prefetch of multiple non-sequential cache lines would have to include multiple instances of the REP PREFETCH instruction described in the above patent to do so. This increases the code size and requires the processor to execute multiple instructions rather than a single instruction. Therefore, what is needed is an improved prefetch instruction that addresses these problems.

BRIEF SUMMARY OF INVENTION

In one aspect the present invention provides a microprocessor. The microprocessor includes an instruction decoder for decoding instructions in an instruction set. The instruction set comprises a repeat prefetch indirect instruction. The repeat prefetch indirect instruction includes address operands used by the microprocessor to calculate an address of a first entry in a prefetch table having a plurality of entries. Each entry of the prefetch table includes a prefetch address. The repeat prefetch indirect instruction also includes a count specifying a number of cache lines to be prefetched. The memory address of each of the cache lines is specified by the prefetch address in one of the plurality of entries in the prefetch table.

In another aspect, the present invention provides a method for prefetching data into a microprocessor. The method includes decoding a repeat prefetch indirect instruction. The method also includes prefetching cache lines into the microprocessor in response to the decoding the repeat prefetch indirect instruction and as instructed by the repeat prefetch indirect instruction. The repeat prefetch indirect instruction includes address operands used to calculate an address of a first entry in a prefetch table having a plurality of entries. Each entry of the prefetch table includes a prefetch address. The repeat prefetch indirect instruction also includes a count specifying the number of the cache lines to be prefetched into the microprocessor. The memory address of each of the cache lines is specified by the prefetch address in one of the plurality of entries in the prefetch table.

In yet another aspect, the present invention provides a microprocessor in a system with a system memory. The microprocessor includes an instruction decoder configured to decode a prefetch instruction that specifies a count of cache lines to prefetch from the system memory and an address that points to a table that holds memory addresses of the cache lines to prefetch. The microprocessor also includes a count register configured to store a remaining count of the cache lines to be prefetched. The count register is initially loaded with the count specified in the prefetch instruction. The microprocessor also includes control logic, coupled to the instruction decoder and to the count register. The control logic is configured to control the microprocessor to fetch the memory addresses of the cache lines from the table into the microprocessor and to prefetch the cache lines from the system memory into a cache memory of the microprocessor using the count register and the memory addresses fetched from the table.

In yet another aspect, the present invention provides a method for prefetching data into a microprocessor in a system with a system memory. The method includes decoding a prefetch instruction that specifies a count of cache lines to prefetch from the system memory and an address that points to a table that holds memory addresses of the cache lines to prefetch. The method also includes maintaining a remaining count of the cache lines to be prefetched. The remaining count is initially the count specified in the prefetch instruction. The method also includes prefetching the cache lines from the system memory into a cache memory of the microprocessor using the remaining count and the memory addresses from the table.

DETAILED DESCRIPTION OF THE INVENTION

Figure 10:
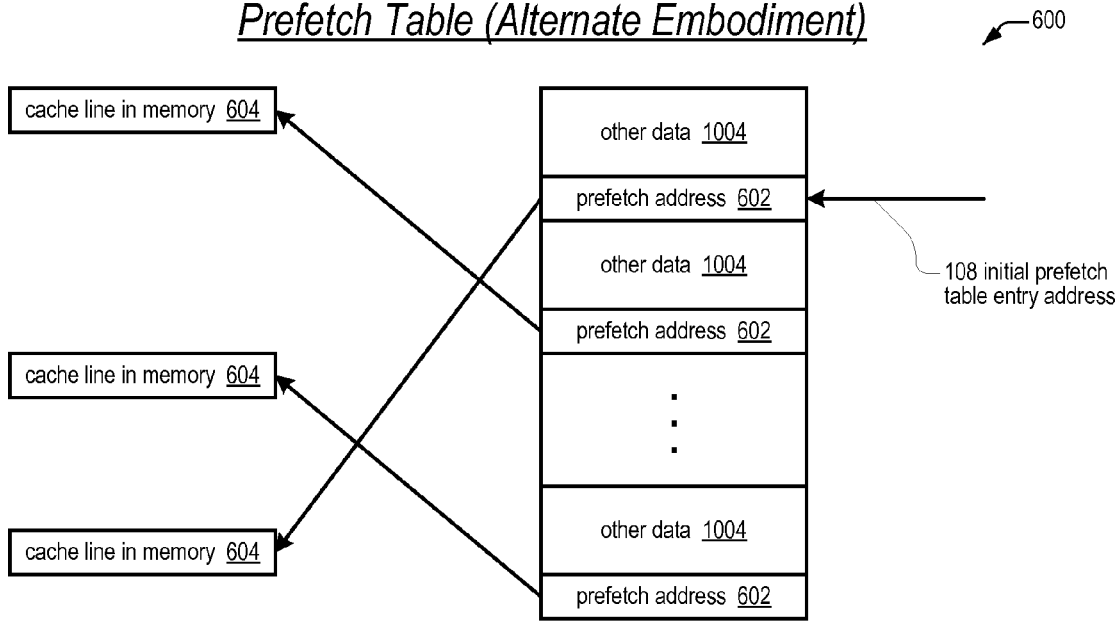
FIG. 10 is a block diagram illustrating an example of a prefetch table according to the alternate embodiment of FIG. 9.

The problem described above is solved by providing a new prefetch instruction that enables the programmer to create a prefetch table 600 (see FIGS. 6 and 10) in memory that includes entries each of which specifies the prefetch address of a cache line to be prefetched. This enables the programmer to specify multiple non-sequential cache lines to be prefetched by the processor. The new prefetch instruction is referred to herein as the REP PREFETCH INDIRECT instruction 500 (see FIG. 5).

Figure 1:
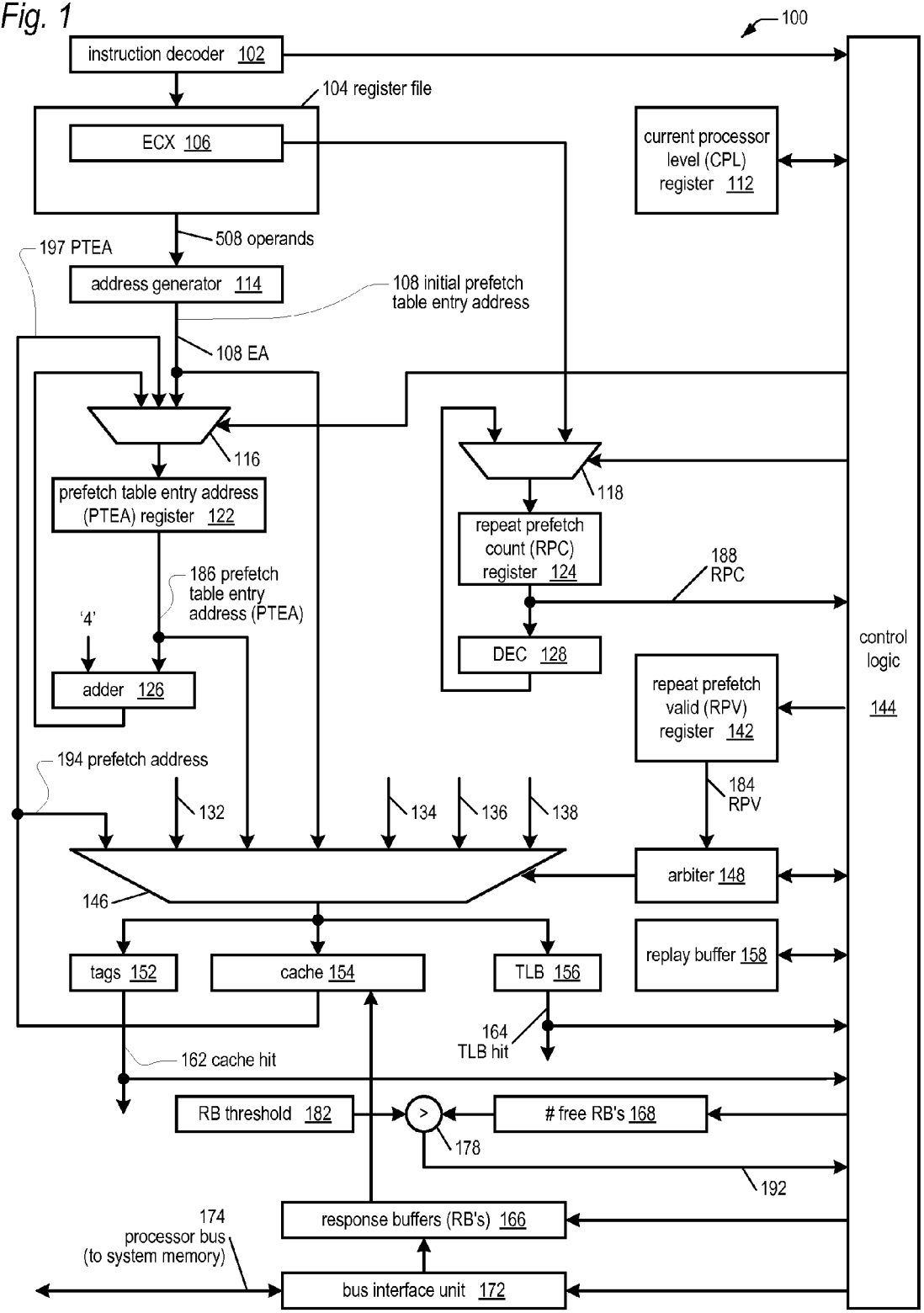
FIG. 1 is a block diagram illustrating a microprocessor capable of executing a REP PREFETCH INDIRECT instruction according to the present invention.
Figure 2:
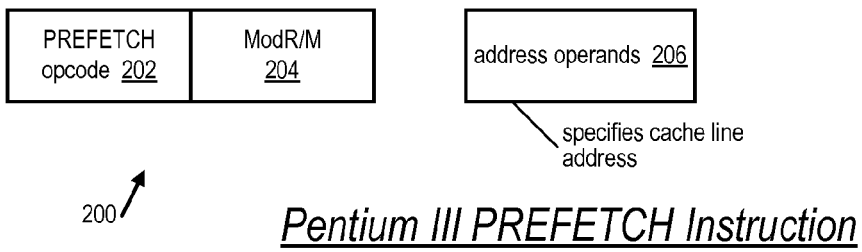
FIG. 2 is a block diagram of a related art Pentium III PREFETCH instruction.
Figure 3:
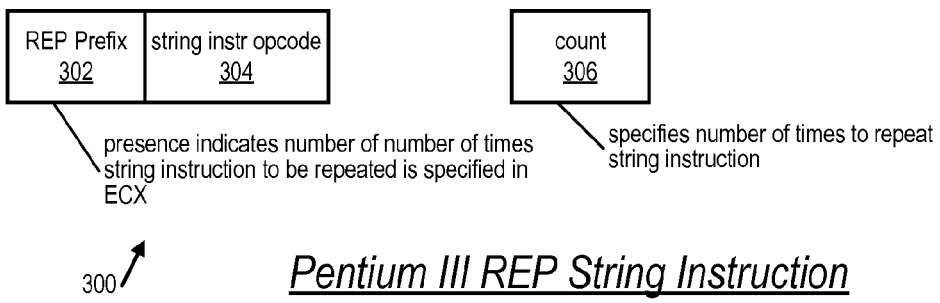
FIG. 3 is a block diagram of a related art Pentium III string instruction with a REP string operation prefix.

Referring now to FIG. 1, a block diagram illustrating a microprocessor 100 capable of executing a REP PREFETCH INDIRECT instruction according to the present invention is shown. The microprocessor 100 is similar in many respects to the microprocessor 100 described with respect to FIG. 1 of U.S. Pat. No. 6,832,296 (hereinafter "the Conventional Microprocessor"), which is hereby incorporated by reference in its entirety for all purposes. However, the microprocessor 100 of FIG. 1 of the instant disclosure includes the following additional features that enable it to execute the REP PREFETCH INDIRECT instruction.

First, the RPA register 122 of the Conventional Microprocessor has been replaced with a prefetch table entry address (PTEA) register 122 that stores the address of the current prefetch table 600 entry. Thus, the PTEA register 122 provides a prefetch table entry address (PTEA) 186 to mux 146, whereas the Conventional Microprocessor provides a prefetch address.

Second, the mux 146 has been modified to additionally receive an input from the cache 154, which provides a prefetch address 194 to the mux 146.

Third, the mux 116 has been modified to additionally receive an input from the cache 154, which provides a prefetch table entry address 197 to the mux 116.

Fourth, the adder 126 has been modified to increment the PTEA 186 by the size of a memory address (e.g., 4 bytes) rather than by the size of a cache line.

Figure 4:
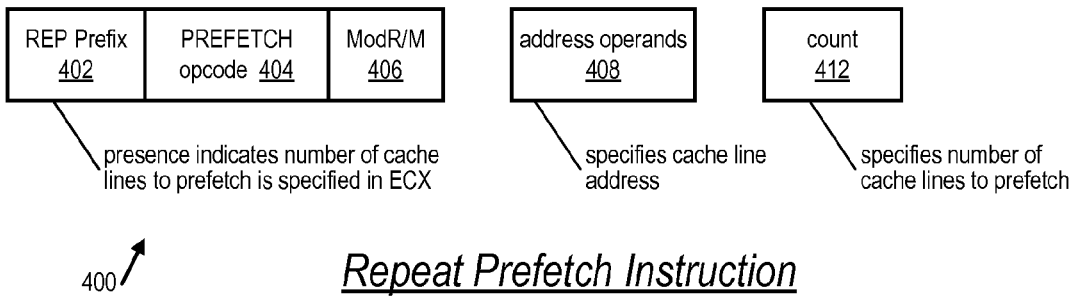
FIG. 4 is a block diagram of a related art repeat prefetch instruction.
Figure 5:
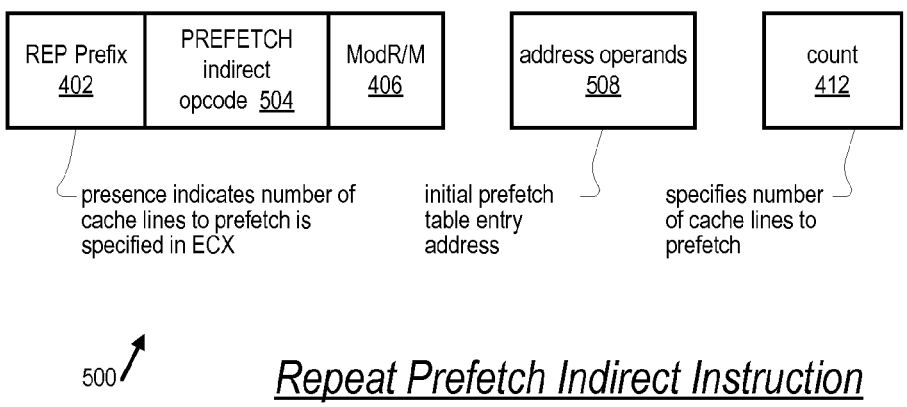
FIG. 5 is a block diagram illustrating the format of a REP PREFETCH INDIRECT instruction according to the present invention.

Referring now to FIG. 5, a block diagram illustrating the format of a REP PREFETCH INDIRECT instruction according to the present invention is shown. The REP PREFETCH INDIRECT instruction is similar to the conventional REP PREFETCH instruction of FIG. 4 of the Conventional Microprocessor in many respects with the following differences. The opcode field 504 value of the REP PREFETCH INDIRECT instruction is different from the opcode field 404 value of FIG. 4 to enable the instruction decoder 102 to distinguish the two instructions. In an alternate embodiment, the two instructions share the same opcode value; however, the REP PREFETCH INDIRECT instruction includes an additional prefix to distinguish it from the conventional REP PREFETCH instruction. Additionally, the address operands 508 of the REP PREFETCH INDIRECT instruction are used to specify the memory address of the initial prefetch table 600 entry, rather than the initial prefetch address.

Figure 6:
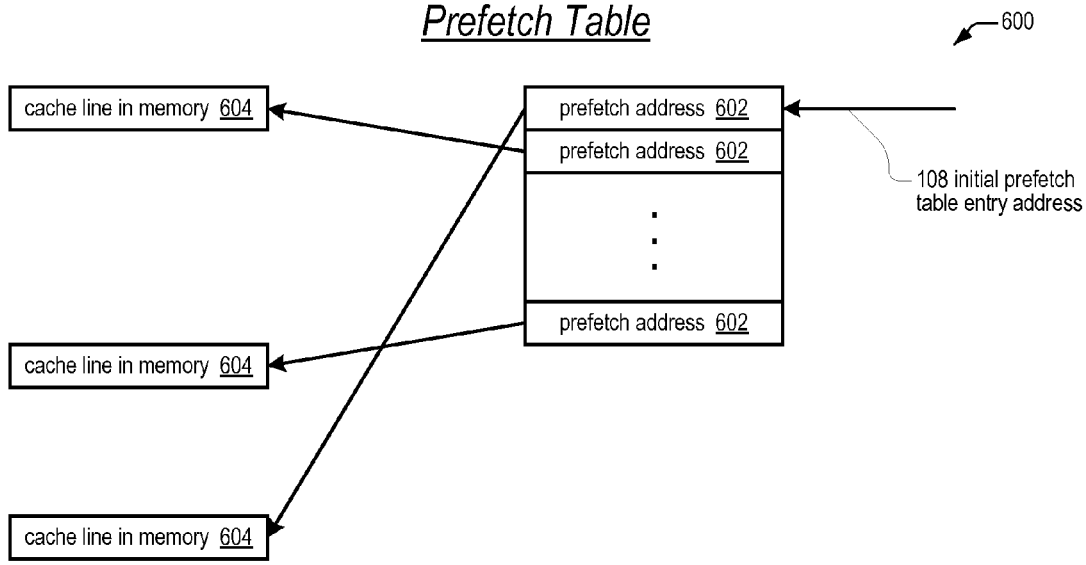
FIG. 6 is a block diagram illustrating a prefetch table according to the present invention.

Referring now to FIG. 6, a block diagram illustrating a prefetch table 600 according to the present invention is shown. The prefetch table includes a plurality of entries, each entry including a prefetch address 602 that points to a cache line 604 in memory, i.e., the prefetch address 602 is the memory address of a cache line 604. In the embodiment of FIG. 6, the prefetch addresses 602 in the prefetch table 600 are adjacent to one another. Thus, the adder 126 of FIG. 1 increments the PTEA 186 by the size of a memory address to point to the next prefetch address 602 entry in the prefetch table 600. As discussed below with respect to FIGS. 8 through 11, another embodiment is contemplated in which the prefetch address 602 entries are non-sequential.

Figure 7:
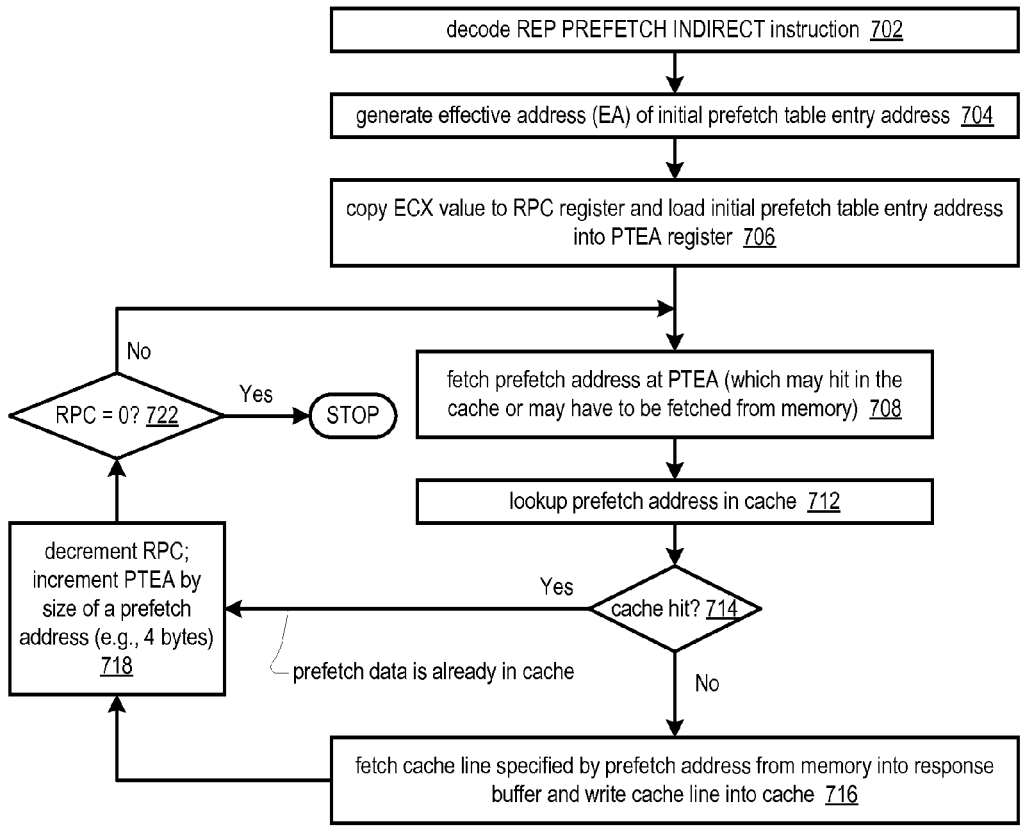
FIG. 7 is a flowchart illustrating operation of the microprocessor of FIG. 1 to execute a REP PREFETCH INDIRECT instruction of FIG. 5 according to the present invention.

Referring now to FIG. 7, a flowchart illustrating operation of the microprocessor 100 of FIG. 1 to execute a REP PREFETCH INDIRECT instruction 500 of FIG. 5 according to the present invention is shown. Flow begins at block 702.

At block 702, the instruction decoder 102 decodes a REP PREFETCH INDIRECT instruction 500. Flow proceeds to block 704.

At block 704, the address generator 114 generates the effective address 108 specified by the ModR/M byte 406 and the address operands of 508 of the REP PREFETCH INDIRECT instruction of FIG. 5. The effective address 108 is the initial prefetch table entry address 108, i.e., the memory address of the first entry of the prefetch table 600. Flow proceeds to block 706.

At block 706, the control logic 144 copies the count value (i.e., the number of cache lines to be prefetched) from the ECX register 106 to the RPC register 124. Additionally, the control logic 114 loads the initial prefetch table entry address 108 to the PTEA register 122 of FIG. 1. The count value in the ECX register 106 was loaded into the ECX register 106 by an instruction previous to the REP PREFETCH INDIRECT instruction. Flow proceeds to block 708.

At block 708, the microprocessor 100 fetches the prefetch address 602 at the location in the prefetch table 600 specified by the PTEA 186. It is noted that the prefetch address 602 may already be present in the cache 154. In particular, when the microprocessor 100 fetches the first prefetch address 602 from the prefetch table 600, the entire cache line implicated by the PTEA 186 will be fetched, according to one embodiment. Consequently, the next several prefetch addresses 602 in the prefetch table 600 will likely be present in the cache 154 after the fetch of the initial prefetch address 602 from the initial prefetch table 600 entry, and this phenomenon will continue as the prefetching progresses through the prefetch table 600. If the prefetch address 602 is not already present in the cache 154, the bus interface unit 114 will fetch it from system memory into a response buffer 166 for subsequent retirement into the cache 154. An alternate embodiment is contemplated in which, in order to avoid polluting the cache 154 with the prefetch addresses 602, the prefetch address 602 is not retired to the cache 154; rather, the response buffer 166 (or other intermediate storage location) provides the prefetch address 602 to the mux 146 to accomplish blocks 712 through 716 and the prefetch address 602 is subsequently discarded. Flow proceeds to block 712.

At block 712, the cache 154 looks up the prefetch address 602 fetched at block 708 that is provided to the mux 146 from the cache 154 (or response buffer 166 or other intermediate storage location) as prefetch address 194. Flow proceeds to decision block 714.

At decision block 714, if the prefetch address 194 hits in the cache 154, flow proceeds to block 718; otherwise, flow proceeds to block 716.

At block 716, the bus interface unit 172 prefetches the cache line 604 specified by the prefetch address 194 from system memory into a response buffer 166, which subsequently writes the prefetched cache line 604 into the cache 154. Flow proceeds to block 718.

At block 718, the control logic 114 controls the decrementer 128 and mux 118 to decrement the value in the RPC register 124 by one. Additionally, the control logic 114 controls the adder 126 and the mux 116 to increment the value in the PTEA register 122 by the size of an address. Flow proceeds to decision block 722.

At decision block 722, the control logic 114 determines whether the RPC 188 is zero. If so, flow ends; otherwise, flow returns to block 708 to accomplish prefetching of the next cache line 604.

Although not described in FIG. 7, embodiments of the microprocessor 100 of the present invention are contemplated which include features described in the Conventional Microprocessor of U.S. Pat. No. 6,832,296, such as stop on TLB miss and replay on lost arbitration or sub-threshold number of free request buffers.

Figure 8:
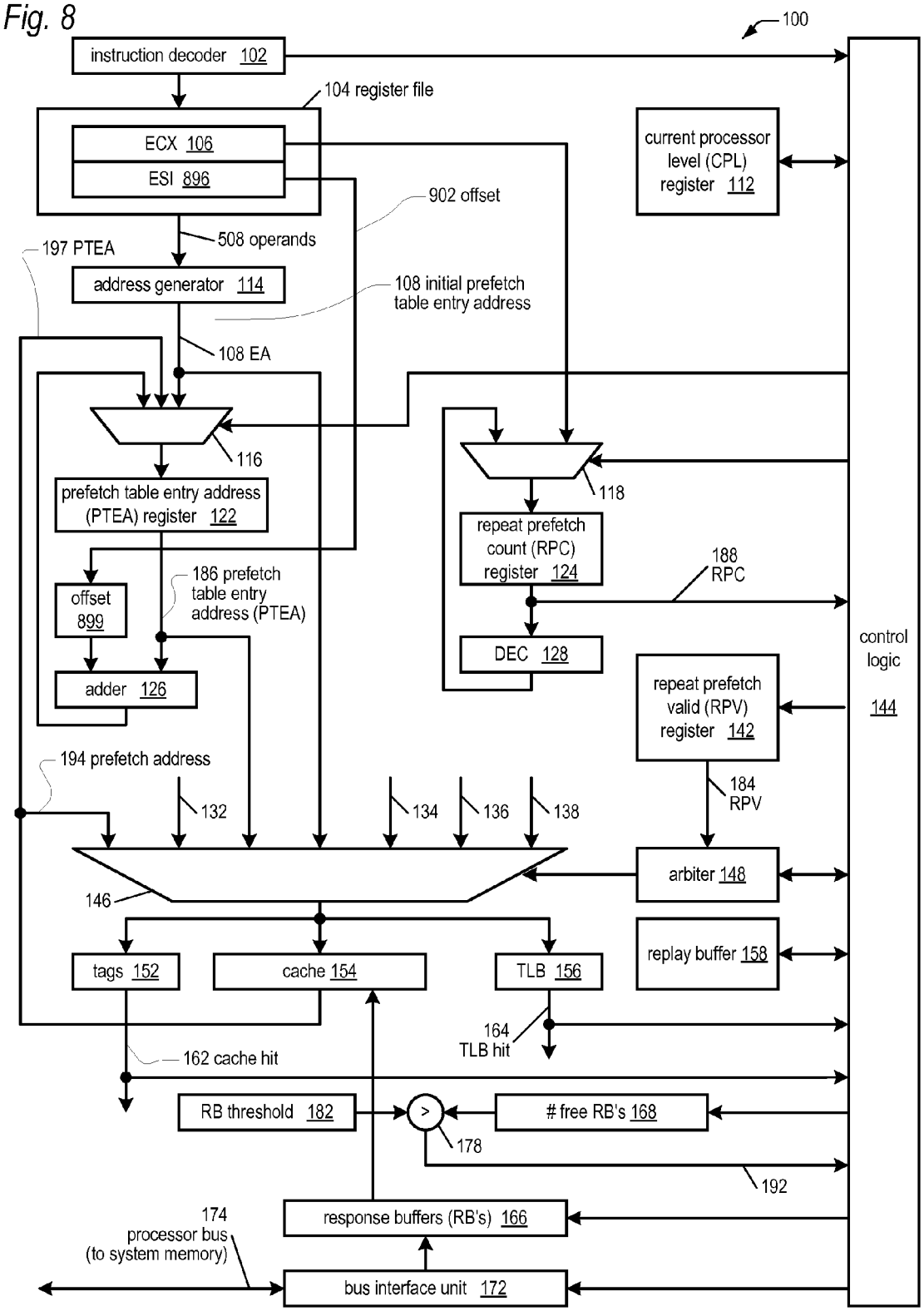
FIG. 8 is a block diagram illustrating a microprocessor capable of executing a REP PREFETCH INDIRECT instruction according to an alternate embodiment of the present invention.
Figure 9:
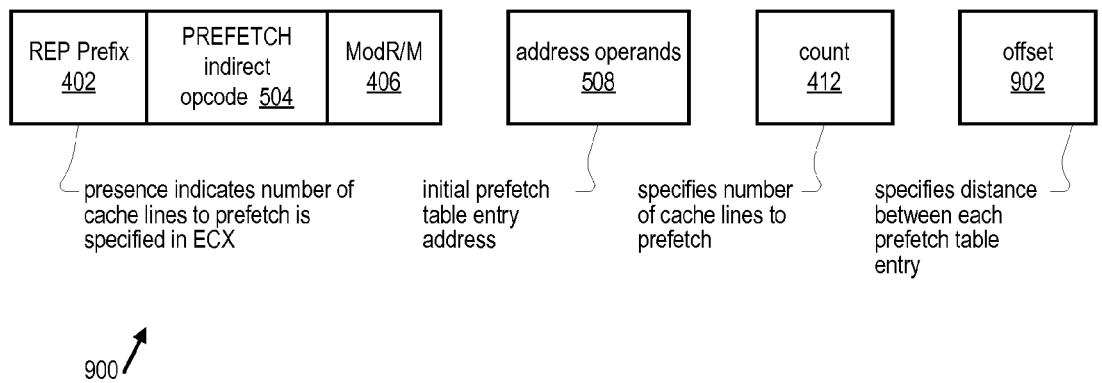
FIG. 9 is a block diagram illustrating the format of a REP PREFETCH INDIRECT instruction according to an alternate embodiment of the present invention.

Referring now to FIG. 8, a block diagram illustrating a microprocessor 100 capable of executing a REP PREFETCH INDIRECT instruction according to an alternate embodiment of the present invention is shown. The microprocessor 100 of FIG. 8 is similar in many respects to the microprocessor 100 of FIG. 1. However, the microprocessor 100 of the embodiment of FIG. 8 is configured to execute an alternate version of the REP PREFETCH INDIRECT instruction, which is shown in FIG. 9. The REP PREFETCH INDIRECT instruction of FIG. 9 includes an offset value 902 that specifies the distance between each prefetch table 600 entry. The offset 902 advantageously enables the programmer to construct a prefetch table 600 that has prefetch addresses 602 in non-sequential locations in memory, such as the prefetch table 1000 shown in FIG. 10, as discussed in more detail below.

Referring again to FIG. 8, the microprocessor 100 of the embodiment of FIG. 8, in contrast to the microprocessor 100 of FIG. 1, includes an offset register 899. The offset register 899 receives the offset value 902 of FIG. 9 from the ESI register 896 of the register file 104 and provides the offset value 902 as one of the inputs to the adder 126 to enable the adder 126 to increment the PTEA register 122 value by the offset value 902 for provision of the next PTEA into the PTEA register 122. The offset value in the ESI register 896 was loaded by an instruction previous to the REP PREFETCH INDIRECT instruction.

Figure 11:
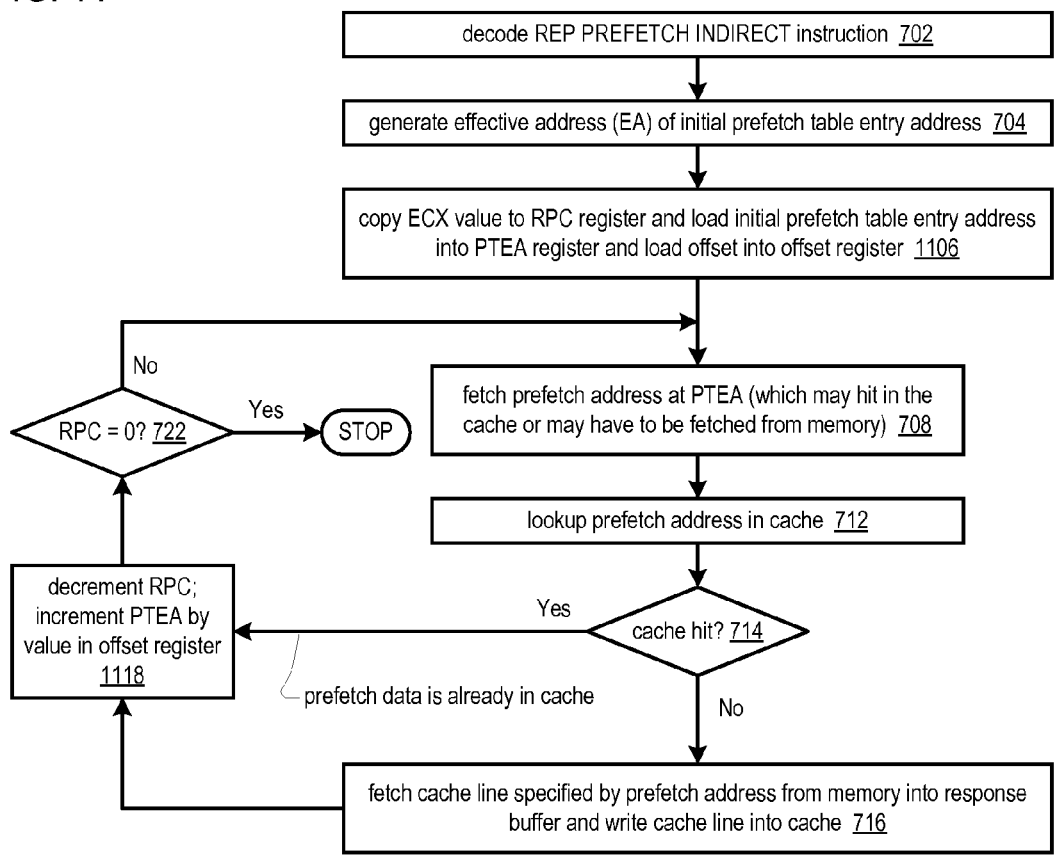
FIG. 11 is a flowchart illustrating operation of the microprocessor of FIG. 8 to execute a REP PREFETCH INDIRECT instruction of FIG. 9 according to an alternate embodiment of the present invention.

Referring now to FIG. 11, a flowchart illustrating operation of the microprocessor 100 of FIG. 8 to execute a REP PREFETCH INDIRECT instruction 900 of FIG. 9 according to an alternate embodiment of the present invention is shown. The flowchart of FIG. 11 is similar to the flowchart of FIG. 7 with the following exceptions.

Block 1106 replaces block 706, and in block 1106, the control logic 114 loads the offset 902 into the offset register 899.

Block 1118 replaces block 718, and in block 1118, the control logic 114 controls the adder 126 and the mux 116 to increment the value in the PTEA register 122 by the value in the offset register 899, rather than by the size of an address.

Referring again to FIG. 10, an example of a prefetch table 1000 according to the alternate embodiment is now discussed to illustrate its advantages. Assume the prefetch table 1000 is an open hash table that includes a plurality of buckets, or data structures. Each bucket includes two fields: an 8-byte hash value (corresponding to the "other data 1004" in FIG. 10) and a 4-byte memory address (corresponding to the "prefetch address 602" in FIG. 10) which is a hash object pointer, as shown here:

HASH TABLE:

Bucket[0]:

Hash Value: 8 bytes
Hash Object Pointer: 4 bytes
Bucket[1]:

Hash Value: 8 bytes
Hash Object Pointer: 4 bytes

-continued

HASH TABLE:

Bucket[2]:

Hash Value: 8 bytes
Hash Object Pointer: 4 bytes

In this example, the REP PREFETCH INDIRECT instruction can be employed with a value of 8 in the ESI register, and the REP PREFETCH INDIRECT instruction will skip over the 8-byte hash value fields to fetch the hash object pointer as the prefetch address 602. Such data structures are common in existing programs (although the size of the values may vary). Enabling the programmer to specify the offset 902 allows the programmer or compiler to use already-existing data structures such as the hash table as a prefetch table 1000, rather than having to construct an additional table just for the REP PREFETCH INDIRECT instruction.

In an alternate embodiment, the programmer may specify a delay value in another general purpose register. If the delay value is non-zero, then when executing the REP PREFETCH INDIRECT instruction, the microprocessor 100 will delay each iteration of prefetching a cache line 604 by the number of instructions specified in the delay value.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:
1. A microprocessor, comprising:
   an instruction decoder, for decoding instructions in an instruction set, wherein the instruction set comprises a repeat prefetch indirect instruction; and
   the repeat prefetch indirect instruction comprising:
      address operands used by the microprocessor to calculate an address of a first entry in a prefetch table having a plurality of entries, wherein each entry of the prefetch table includes a prefetch address;
a count specifying a number of cache lines to be prefetched, wherein the memory address of each of the cache lines is specified by the prefetch address in one of the plurality of entries in the prefetch table; and
a delay value, wherein the microprocessor is configured to execute the repeat prefetch indirect instruction by delaying each iteration of prefetching one of the cache lines by a number of instructions specified in the delay value.

2. The microprocessor of claim 1, wherein the instruction set comprises at least a set of instructions defined by an Intel Pentium III processor.

3. The microprocessor of claim 1, wherein the repeat prefetch indirect instruction further comprises:
an opcode, different from a Pentium III PREFETCH instruction opcode.

4. The microprocessor of claim 3, wherein the repeat prefetch indirect instruction further comprises:
a Pentium III REP string instruction prefix preceding the opcode.

5. The microprocessor of claim 1, wherein the repeat prefetch indirect instruction further comprises:
a Pentium III PREFETCH instruction opcode;
a Pentium III REP string instruction prefix preceding the opcode; and
a second prefix preceding the opcode.

6. The microprocessor of claim 5, wherein the second prefix distinguishes the repeat prefetch indirect instruction from a repeat prefetch instruction.

7. The microprocessor of claim 1, wherein the plurality of entries of the prefetch table reside at non-contiguous memory locations.

8. The microprocessor of claim 1, wherein the repeat prefetch indirect instruction further comprises:
an offset value, for specifying a distance between each of the plurality of entries of the prefetch table.

9. The microprocessor of claim 8, wherein the offset value is loaded into a general purpose register by an instruction previous to the repeat prefetch indirect instruction.

10. The microprocessor of claim 1, wherein the delay value is loaded into a general purpose register by an instruction previous to the repeat prefetch indirect instruction.

11. The microprocessor of claim 1, further comprising:
a register file, coupled to the instruction decoder, the register file comprising an ECX register of a Pentium III architecture register file, wherein the count is stored in the ECX register.

12. The microprocessor of claim 11, wherein the count is loaded into the ECX register by an instruction prior to the repeat prefetch indirect instruction.

13. The microprocessor of claim 1, wherein the address operands are specified in a segment:offset format conforming to a Pentium III architecture segment:offset format.

14. The microprocessor of claim 13, wherein the one or more registers conform to Pentium III DS:ESI registers.

15. A method for prefetching data into a microprocessor, the method comprising:
decoding a repeat prefetch indirect instruction; and
prefetching cache lines into the microprocessor in response to said decoding the repeat prefetch indirect instruction and as instructed by the repeat prefetch indirect instruction;
wherein the repeat prefetch indirect instruction comprises:
address operands used to calculate an address of a first entry in a prefetch table having a plurality of entries, wherein each entry of the prefetch table includes a prefetch address; and
a count specifying the number of the cache lines to be prefetched into the microprocessor, wherein the memory address of each of the cache lines is specified by the prefetch address in one of the plurality of entries in the prefetch table;
a delay value, wherein said prefetching comprises delaying each iteration of prefetching one of the cache lines by a number of instructions specified in the delay value.

16. The method of claim 15, wherein the repeat prefetch indirect instruction further comprises:
an opcode, different from a Pentium III PREFETCH instruction opcode.

17. The method of claim 16, wherein the repeat prefetch indirect instruction further comprises:
a Pentium III REP string instruction prefix preceding the opcode.

18. The method of claim 15, wherein the repeat prefetch indirect instruction further comprises:
a Pentium III PREFETCH instruction opcode;
a Pentium III REP string instruction prefix preceding the opcode; and
a second prefix preceding the opcode.

19. The method of claim 15, wherein the repeat prefetch indirect instruction further comprises:
an offset value, for specifying a distance between each of the plurality of entries of the prefetch table.

20. The method of claim 15, wherein the delay value is loaded into a general purpose register by an instruction previous to the repeat prefetch indirect instruction.

21. A microprocessor in a system with a system memory, the microprocessor comprising:
an instruction decoder, configured to decode a prefetch instruction that specifies a count of cache lines to prefetch from the system memory and an address that points to a table that holds memory addresses of the cache lines to prefetch;
a count register, configured to store a remaining count of the cache lines to be prefetched, wherein the count register is initially loaded with the count specified in the prefetch instruction; and
control logic, coupled to the instruction decoder and to the count register, the control logic configured to control the microprocessor to fetch the memory addresses of the cache lines from the table into the microprocessor and to prefetch the cache lines from the system memory into a cache memory of the microprocessor using the count register and the memory addresses fetched from the table;
wherein the prefetch instruction further specifies a delay value, wherein the control logic is configured to delay prefetching each of the cache lines by a number of instructions specified in the delay value.

22. The microprocessor of claim 21, wherein the cache lines are non-sequential in the system memory.

23. The microprocessor of claim 21, further comprising:
a decrementer, coupled to the count register, controlled by the control logic to decrement the remaining count in response to prefetching each of the cache lines.

24. The microprocessor of claim 21, further comprising:

an address register, configured to store an entry address, wherein the entry address points to one of the memory addresses in the table of one of the cache lines currently being prefetched.

25. The microprocessor of claim 24, wherein the control logic is configured to initially load the address register with the address specified by the prefetch instruction.

26. The microprocessor of claim 24, wherein the control logic is configured to update the entry address stored in the address register in response to prefetching each of the cache lines.

27. The microprocessor of claim 23, further comprising:

an adder, coupled to the address register, configured to add an addend to the entry address stored in the address register to generate a sum, in response to prefetching each of the cache lines;

wherein the control register is configured to update the address register with the sum.

28. The microprocessor of claim 27, wherein the addend is the size of a memory address.

29. The microprocessor of claim 27, wherein the addend is an offset value specified by the prefetch instruction.

30. The microprocessor of claim 21, wherein the prefetch instruction further specifies an offset value that specifies a distance between each of the memory addresses held in the table.

31. The microprocessor of claim 21, wherein the control logic is configured to fetch the memory addresses of the cache lines from the table into the cache memory.

32. The microprocessor of claim 21, wherein the control logic is configured to fetch the memory addresses of the cache lines from the table into storage of the microprocessor other than the cache memory of the microprocessor and to refrain from retiring the memory addresses to the cache memory.

33. The microprocessor of claim 32, wherein the storage of the microprocessor other than the cache memory comprises a response buffer.

34. The microprocessor of claim 21, wherein the delay value is loaded into a general purpose register by an instruction previous to the repeat prefetch indirect instruction.

35. The microprocessor of claim 21, wherein the prefetch instruction specifies an opcode, different from a Pentium III PREFETCH instruction opcode.

36. The microprocessor of claim 35, wherein the prefetch instruction further specifies a Pentium III REP string instruction prefix preceding the opcode.

37. The microprocessor of claim 21, wherein the prefetch instruction specifies a Pentium III PREFETCH instruction opcode preceded by a Pentium III REP string instruction prefix and a second prefix preceding the opcode.

38. A method for prefetching data into a microprocessor in a system with a system memory, the method comprising:

decoding a prefetch instruction that specifies a count of cache lines to prefetch from the system memory and an address that points to a table that holds memory addresses of the cache lines to prefetch;

maintaining a remaining count of the cache lines to be prefetched, wherein the remaining count is initially the count specified in the prefetch instruction;

prefetching the cache lines from the system memory into a cache memory of the microprocessor using the remaining count and the memory addresses from the table; and delaying prefetching each of the cache lines by a number of instructions specified in a delay value specified by the prefetch instruction.

39. The method of claim 38, wherein the cache lines are non-sequential in the system memory.

40. The method of claim 38, further comprising:

maintaining an entry address, wherein the entry address points to one of the memory addresses in the table of one of the cache lines currently being prefetched, wherein the entry address is initially the address specified by the prefetch instruction.

41. The method of claim 40, wherein said maintaining the entry address comprises:

adding an addend to the entry address in response to prefetching a cache line.

42. The method of claim 41, wherein the addend is the size of a memory address.

43. The method of claim 41, wherein the addend is an offset value specified by the prefetch instruction.

44. The method of claim 38, wherein the prefetch instruction further specifies an offset value that specifies a distance between each of the memory addresses held in the table.

45. The method of claim 38, further comprising:

fetching the memory addresses of the cache lines from the table into the cache memory.

46. The method of claim 38, further comprising:

fetching the memory addresses of the cache lines from the table into storage of the microprocessor other than the cache memory of the microprocessor and refraining from retiring the memory addresses to the cache memory.

47. The method of claim 38, wherein the delay value is loaded into a general purpose register by an instruction previous to the repeat prefetch indirect instruction.

48. The method of claim 38, wherein the prefetch instruction specifies an opcode, different from a Pentium III PREFETCH instruction opcode.

49. The method of claim 48, wherein the prefetch instruction further specifies a Pentium III REP string instruction prefix preceding the opcode.

50. The method of claim 38, wherein the prefetch instruction specifies a Pentium III PREFETCH instruction opcode preceded by a Pentium III REP string instruction prefix and a second prefix preceding the opcode.

\* \* \* \* \*